Patented June 30, 1942

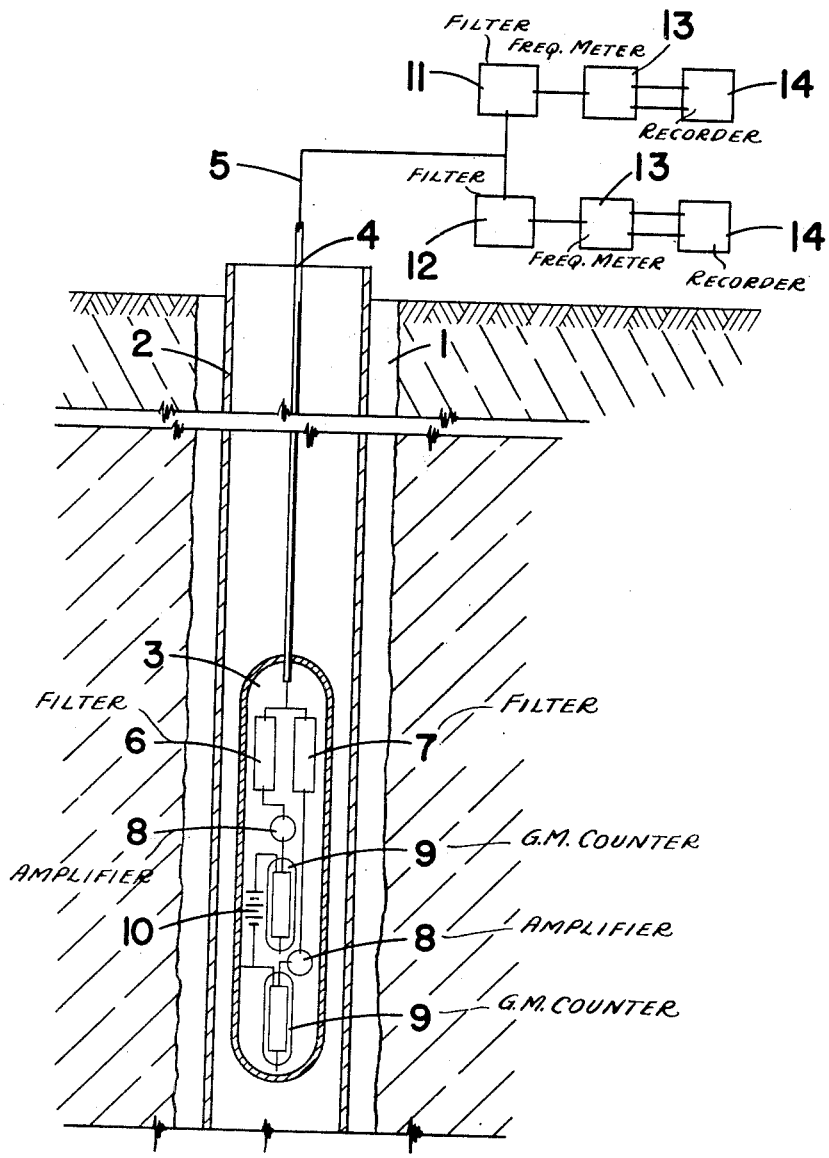

2,288,278

UNITED STATES PATENT OFFICE 2,288,278

GAMMA-RAY WELL LOGGING

Lynn G. Howell, Houston, Tex., assignor to Standard Oil Development Company, a corporation of Delaware Application June 23, 1941, Serial No. 399,327

2 Claims. (Cl. 250—83.6)

The present invention is directed to a method and apparatus for logging wells by measurement of the gamma-ray intensity along the well.

In the logging of wells by the measurement of gamma-ray intensity along the well resulting from emanations of gamma-rays from the formations surrounding the well, it is often the practice to use a Geiger-Muller counter as the gamma-ray sensitive device in the borehole. Because of statistical variations in the count generated by a Geiger-Muller counter, it has been found expedient in many cases to repeat runs on a single well so as to determine whether or not certain deflections on the record are really significant. To avoid repeat runs, it has been proposed to use a plurality of counters simultaneously in the borehole. Ordinarily, this would require the use of a multi-conductor cable and give rise to all the difficulties incident to the use of such cables.

The principal object of the present invention is the provision of a method and apparatus for logging wells by measuring gamma-ray intensity along the well wherein a number of Geiger-Muller counters are arranged in a bomb to be lowered in the well and the response of these several counters is transmitted to the surface through a single conductor and the various responses separated at the surface and separately recorded.

According to the present invention, advantage is taken of the fact that pulses generated by a Geiger-Muller counter have a more or less continuous frequency spectrum over a broad range and of the further fact that a very substantial part of this range has a substantial amplitude. Thus, according to the present invention, means are provided in the bomb with the Geiger-Muller counter to pass to the conductor connected with the surface only a selected portion of the range of frequencies included in the pulses from the respective counters, the portion passed being distinctive for each Geiger-Muller counter. In other words, band-pass filters are associated with the individual Geiger-Muller counters in the bomb and these filters are so constructed and adjusted that each will pass a range of frequencies distinct from the range passed by each of the other filters, whereby for each Geiger-Muller counter there is transmitted to the surface a band of frequencies carved out, so to speak, of the pulses generated by each counter, and these bands are separated at the surface and separately recorded.

The electrical devices used in the practice of the present invention are all old and well known. For example, it is known to use a Geiger-Muller counter and an amplifier in a bomb lowered into a borehole. There is a wide knowledge of band-pass filters available in published literature. Typical of articles which discuss the design and operation of band-pass filters may be mentioned Chapter 7, pp. 151 et seq. of the 1932 edition of Communication Engineering by Everitt.

The nature and objects of the present invention may be better understood from the following detailed description of the accompanying drawing in which the single figure is a vertical section, partly in diagrammatic form, of an apparatus according to the present invention in place in a borehole.

Referring to the drawing in detail, numeral 1 designates a borehole provided with a metallic casing 2. Suspended in the borehole is a bomb 3 having its walls made of steel or other material capable of offering the necessary resistance to the pressure encountered in a borehole. This bomb 3 is suspended by a cable 4 carrying a single conductor 5. Inside the bomb the conductor 5 is connected to the output of a band-pass filter 6, and similarly to a second band-pass filter 7 so designed as to pass a band of frequencies distinct from that which will pass through the filter 6. Each filter is connected to the output of an amplifier 8 which, in turn, receives the pulses generated by a Geiger-Muller counter 9. The voltage required for the operation of these counters is supplied by batteries 10.

At the surface the conductor 5 is connected to band-pass filters 11 and 12. One of these filters is the same as filter 6 and the other is the same as filter 7. The output from each of these filters is fed into frequency meter 13 which, in turn, is connected to a recording device 14. It will be understood that these recording devices are of the photographic type in which a beam of light, the movement of which is controlled by the output of the frequency meter, is caused to move over a sensitized film which, in turn, moves in synchronism with the movement of the bomb in the borehole, whereby a record is obtained in which the measurements are correlated with depth.

As has been previously indicated, the present invention does not reside in any particular electrical equipment, but merely in the utilization of known electrical equipment for a particular purpose. For this reason, the various electrical devices, such as filters, amplifiers, frequency meters, and the like, are represented symbolically. It may be mentioned that, for the operation of a system utilizing two Geiger-Muller counters, it is satisfactory to use as filter 6, one which will pass frequencies between 100 and 400, and as filter 7, one which will pass frequencies between 600 and 1,000. It will be understood that these ranges can be changed, and made either narrower or broader. The range of frequencies available in the pulses is such that any desired number of counters can be used in this system, although only two are indicated for purposes of illustration.

The nature and objects of the present invention having been thus described and illustrated, what is claimed as new and useful and is desired to be secured by Letters Patent is:

1. A method for logging boreholes by measuring gamma-ray intensity along the borehole by the use of a Geiger-Muller counter, which comprises lowering a plurality of Geiger-Muller counters in the borehole, isolating from the pulses generated by each counter a band of the frequencies contained in said pulses, said band so isolated being different for each counter and the various bands so selected as not to overlap, transmitting the bands so isolated to the surface through a single conductor, separating the bands at the surface, and separately recording a plurality of values each of which is a function of the frequency of the pulses of an individual counter.

2. An apparatus for logging boreholes comprising a bomb adapted to be lowered in the borehole, a plurality of Geiger-Muller counters arranged in said bomb, a band-pass filter connected to the output of each counter, the respective filters being capable of passing different bands of frequencies, a recording device for each counter arranged at the surface, a band-pass filter having its output connected to the input of each recorder, the band-pass filter for each recorder being adapted to pass the same band of frequencies as the band-pass filter connected to the corresponding counter, and a single conductor connecting the outputs of the various band-pass filters in the bomb to the inputs of the various band-pass filters at the surface.

LYNN G. HOWELL.